US011923798B2

(12) United States Patent
Hettel et al.

(10) Patent No.: US 11,923,798 B2
(45) Date of Patent: Mar. 5, 2024

(54) DRIVE SYSTEM WITH INVERTER AND ELECTRIC MOTOR, AND METHOD FOR OPERATING A DRIVE SYSTEM

(71) Applicant: SEW-EURODRIVE GMBH & CO. KG, Bruchsal (DE)

(72) Inventors: Norbert Hettel, Au am Rhein (DE); Alexander Kolbert, Weingarten (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 183 days.

(21) Appl. No.: 17/429,393

(22) PCT Filed: Jan. 23, 2020

(86) PCT No.: PCT/EP2020/025028
§ 371 (c)(1),
(2) Date: Aug. 9, 2021

(87) PCT Pub. No.: WO2020/160841
PCT Pub. Date: Aug. 13, 2020

(65) Prior Publication Data
US 2022/0149758 A1 May 12, 2022

(30) Foreign Application Priority Data
Feb. 7, 2019 (DE) .......................... 102019000875.8

(51) Int. Cl.
*H02P 3/22* (2006.01)
(52) U.S. Cl.
CPC ..................................... *H02P 3/22* (2013.01)
(58) Field of Classification Search
CPC .. H02P 7/04; H02P 3/22; G11B 5/022; H02H 7/0838

USPC ............................. 318/375, 400, 26, 400.29
See application file for complete search history.

(56) References Cited

U.S. PATENT DOCUMENTS

2005/0174081 A1* 8/2005 Nguyen ................... H02P 3/12
318/376
2009/0066272 A1* 3/2009 Jobard .................... B60L 7/003
318/375

FOREIGN PATENT DOCUMENTS

DE 102004057915 A1 * 6/2006 ................ H02P 3/04
DE 102004057915 A1 6/2006
DE 102007058098 A1 6/2008

OTHER PUBLICATIONS

JP2008092686A "DynamicBrakeDevice" DatePublished Apr. 17, 2008 Kondotakesh (Year: 2008).*

(Continued)

*Primary Examiner* — Jorge L Carrasquillo
(74) *Attorney, Agent, or Firm* — CARTER, DELUCA & FARRELL LLP

(57) ABSTRACT

In a drive system having an inverter and electric motor, and a method for operating a drive system, the electric motor is fed from the AC-voltage-side terminal of the inverter, a first series circuit, which includes a brake resistor and a first controllable semiconductor switch, is connected at the DC-voltage-side terminal of the inverter, and a second series circuit, which includes an impedance and a controllable second semiconductor switch, is connected in parallel with the first series circuit, e.g., in parallel with the DC-voltage-side terminal of the inverter.

22 Claims, 2 Drawing Sheets

(56) References Cited

OTHER PUBLICATIONS

CN108574427A "TransducerBrakeUnitAndAFrequencyConverter" DatePublished Sep. 25, 2018 Zhao, Yan-feng (Year: 2018).*
International Search Report issued in corresponding International Application No. PCT/EP2020/025028, dated Apr. 14, 2020, pp. 1-2, English Translation.

* cited by examiner

DRIVE SYSTEM WITH INVERTER AND ELECTRIC MOTOR, AND METHOD FOR OPERATING A DRIVE SYSTEM

FIELD OF THE INVENTION

The present invention relates to a drive system having an inverter and an electric motor, and to a method for operating a drive system.

BACKGROUND INFORMATION

Certain conventional drive systems can be arranged as an inverter-fed electric motor.

SUMMARY

Example embodiments of the present invention provide a drive system offering greater safety.

According to an example embodiment of the present invention, in a drive system having an inverter and electric motor, the electric motor is fed from the AC-voltage-side terminal of the inverter, a first series circuit, which includes a brake resistor and a first controllable semiconductor switch, is connected at the DC-voltage-side terminal of the inverter, and a second series circuit, which includes an impedance and a controllable second semiconductor switch, is connected in parallel with the first series circuit, e.g., in parallel with the DC-voltage-side terminal of the inverter.

This has the advantage that excess power is able to be routed to the brake resistor, and once the power limit of the brake resistor has been reached, the first semiconductor switch can be opened. The semiconductor switches of the inverter are able to be opened at the same time. Since the current then driven by the stray inductivity of the electric motor and flowing further to the free-wheeling diodes disposed in parallel with the semiconductor switches causes a voltage rise, this voltage rise is able to be limited by closing the second semiconductor switch. The impedance only needs a much lower power limit than the brake resistor because only the energy then present in excess in the intermediate circuit has to be dissipated. Additional power no longer flows into the intermediate circuit.

The drive thus has a configuration that provides greater safety. The drive particularly protects itself from an overvoltage.

According to example embodiments, the impedance may be arranged as an inductivity or as an Ohmic resistor. This has the advantage of achieving a cost-effective configuration.

According to example embodiments, the drive system has a signal electronics, which is connected to a device for acquiring the voltage applied at the DC-voltage-side terminal of the inverter and is configured so that an actuation signal for the first semiconductor switch and an actuation signal for the second semiconductor switch are generated such that the first semiconductor switch is closed when the voltage exceeds a first threshold value and is opened when the voltage exceeds a third threshold value, and the second semiconductor switch is closed when the voltage exceeds a fourth threshold value, and in particular is opened when it was closed for a maximum time span.

This offers the advantage that when the voltage rises, an attempt is initially made to route the excess energy of the intermediate circuit to a brake resistor. In a further rise of the voltage and once a critical threshold value is exceeded, the brake resistor is cut off and the semiconductor switches of the inverter are opened as well. These semiconductor switches are disposed in three half bridges switched in parallel with one another, and an upper and a lower semiconductor switch are connected in series in each half bridge. When the semiconductor switches are opened, a current is driven through the free-wheeling diodes that are connected in parallel with the semiconductor switches due to the stray inductivity of the electric motor. In the process, the voltage rises up to a second critical value, that is to say, the fourth threshold value, upon whose exceedance the impedance is then connected in order to lower the voltage by withdrawing the excess energy from the intermediate circuit and converting it into heat via the impedance.

According to example embodiments, the inverter has semiconductor switches, which are, for example, arranged in half bridges connected in parallel, and each half bridge has an upper and a lower semiconductor switch, which is connected in series thereto, the parallel circuit of the half bridges, for example, forming the DC-voltage-side terminal of the inverter or being directly connected to it, for example. This offers the advantage that a one-phase or multiphase alternating voltage can be provided to the electric motor by a pulse-width-modulated actuation of the semiconductor switches of the inverter.

According to example embodiments, the semiconductor switches of the inverter are opened when the voltage exceeds a third threshold value. This has the advantage that the inverter is protected from a dangerously high voltage.

According to example embodiments, the first threshold value is lower than the third threshold value, and the third threshold value is lower than the fourth threshold value. This offers the advantage that in a voltage rise an attempt is initially made to stop the voltage rise with the aid of the brake resistor. However, if this is unsuccessful, for instance because the dimensions of the brake resistor are too small or the brake resistor is not provided, the voltage reaches the fourth threshold value. The semiconductor switches of the inverter and the brake resistor are then opened so that the parts of the inverter are protected.

According to example embodiments, the first semiconductor switch is opened when the voltage drops below a second threshold value, the second threshold value being lower than the first threshold value. This offers the advantage that a renewed deactivation of the brake resistor is carried out with a hysteresis. Oscillations are therefore avoidable.

According to an example embodiment of the present invention, in a method for operating a drive system, a first series circuit, which includes a brake resistor and a first controllable semiconductor switch, is connected at the DC-voltage-side terminal of an inverter of the drive system, a second series circuit, which includes an impedance and a controllable second semiconductor switch, is connected in parallel with the first series circuit, e.g., in parallel with the DC-voltage-side terminal of the inverter, and the voltage applied at the DC-voltage-side terminal of the inverter is acquired and an actuation signal for the first semiconductor switch and an actuation signal for the second semiconductor switch is generated such that the first semiconductor switch is closed when the voltage exceeds a first threshold value and is opened when the voltage exceeds a third threshold value, and the second semiconductor switch is closed when the voltage exceeds a fourth threshold value, for example, and is opened when it was closed for a maximum time span.

This offers the advantage that high protection is achieved for the converter. Because if the power produced in a generator mode is unable to be adequately dissipated in the form of heat with the aid of the brake resistor and the voltage therefore continues to rise, the semiconductor switches are able to be switched off by reducing the still rising voltage in that the impedance absorbs energy from the intermediate circuit.

According to example embodiments, the semiconductor switches of the inverter are opened when the voltage exceeds a third threshold value. This is considered advantageous insofar as the inverter is protectable from destruction by an overvoltage.

According to example embodiments, the first threshold value is smaller than the third threshold value, and the third threshold value is smaller than the fourth threshold value. This has the advantage that the brake resistor is switched off when the voltage is dangerously high, and if the voltage continues to rise, the entire energy still present in the intermediate circuit is converted into heat via the impedance. This is because the rectifier supplies no energy into the intermediate circuit since the voltage is higher than the peak voltage of the supplying AC-voltage supply network.

According to example embodiments, the first semiconductor switch is opened when the voltage drops below a second threshold value, the second threshold value being lower than the first threshold value. This is considered advantageous insofar as the brake resistor is separated from the intermediate circuit at permissible voltage values since no conversion of energy of the intermediate circuit into heat is required.

Further features and aspects of example embodiments of the present invention are described in greater detail below with reference to the appended schematic Figures.

DETAILED DESCRIPTION

Figure 1:
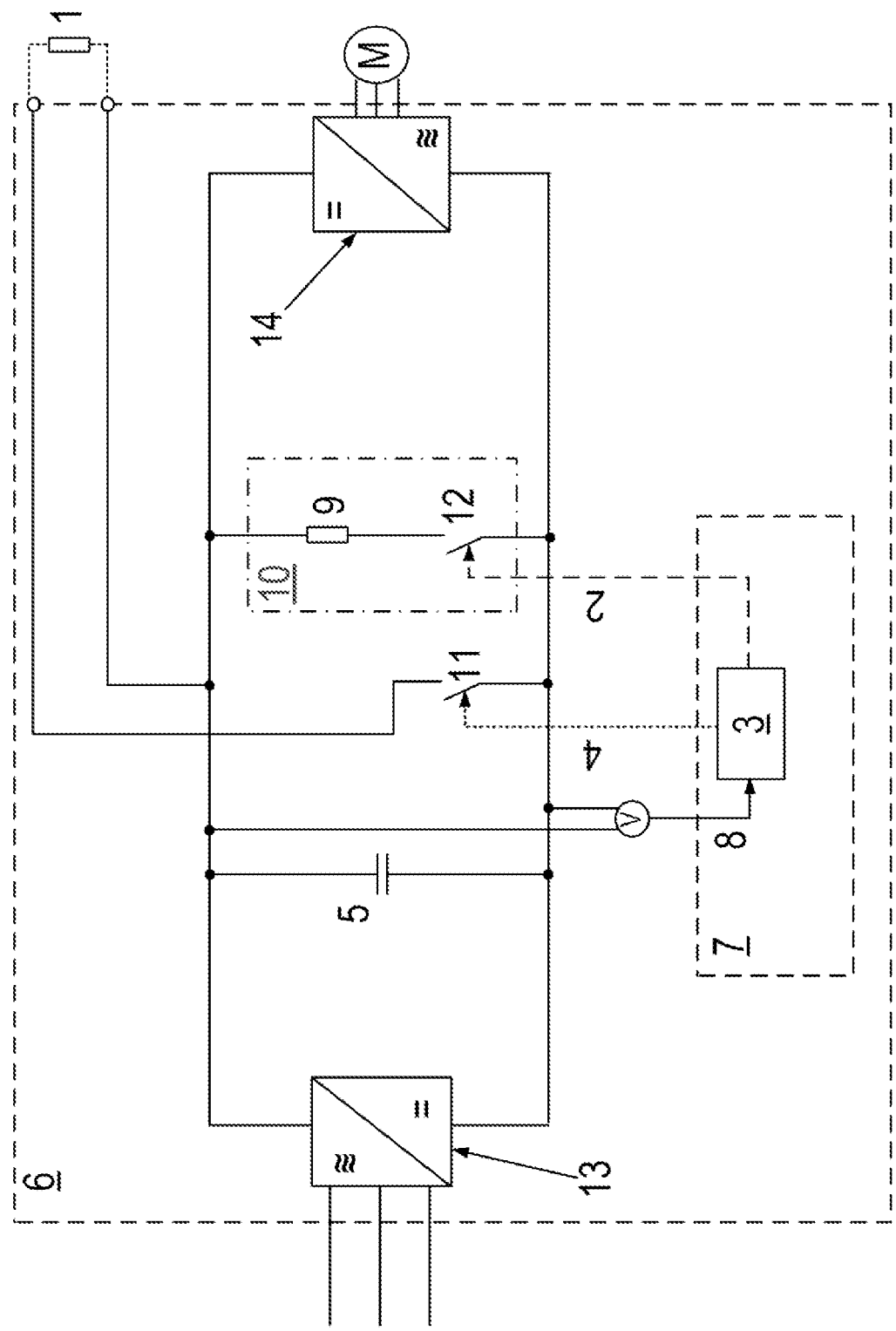
FIG. 1 schematically illustrates a drive system, according to an example embodiment of the present invention, which has a converter-fed electric motor, the converter including a control logic 3.

As schematically illustrated in the Figures, the drive system has a converter 6 whose rectifier 13 is able to be supplied with electrical energy from an AC-voltage supply network.

A capacitance 5, which may be referred to as an intermediate circuit capacitor, is situated at the DC-voltage-side terminal of rectifier 13. An inverter 14 is able to be supplied from the intermediate circuit voltage smoothed in this manner. To this end, the DC-voltage-side terminal of inverter 14 is connected to the DC-voltage-side terminal of rectifier 13. A voltage acquisition device acquires the voltage applied at this terminal, i.e., in particular, at the intermediate circuit capacitor, and the generated voltage signal is conveyed to an evaluation electronics 7. A first actuation signal 4 for a first controllable semiconductor switch 11 and a second actuation signal 2 for a second controllable semiconductor switch 12 are generated as a function of the voltage signal and/or its characteristic.

First semiconductor switch 11 is situated in series with a brake resistor 1, which is disposed outside the housing of converter 6 or, as an alternative, inside the housing of the converter.

This series circuit formed by first semiconductor switch 11 and brake resistor 1 is supplied from the voltage applied at the DC-voltage-side terminal of inverter 14.

Second semiconductor switch 12 is situated in series with an impedance 9, e.g., a resistor or an inductivity, which is disposed inside the housing of the converter.

This series circuit, which includes second semiconductor switch 12 and impedance 9, is also supplied with the voltage applied at the DC-voltage-side terminal of inverter 14.

An electric motor M, e.g., a three-phase motor, whose rotational speed is able to be regulated or at least controlled by the converter, is connected at the AC-voltage-side output of the inverter.

Figure 2:
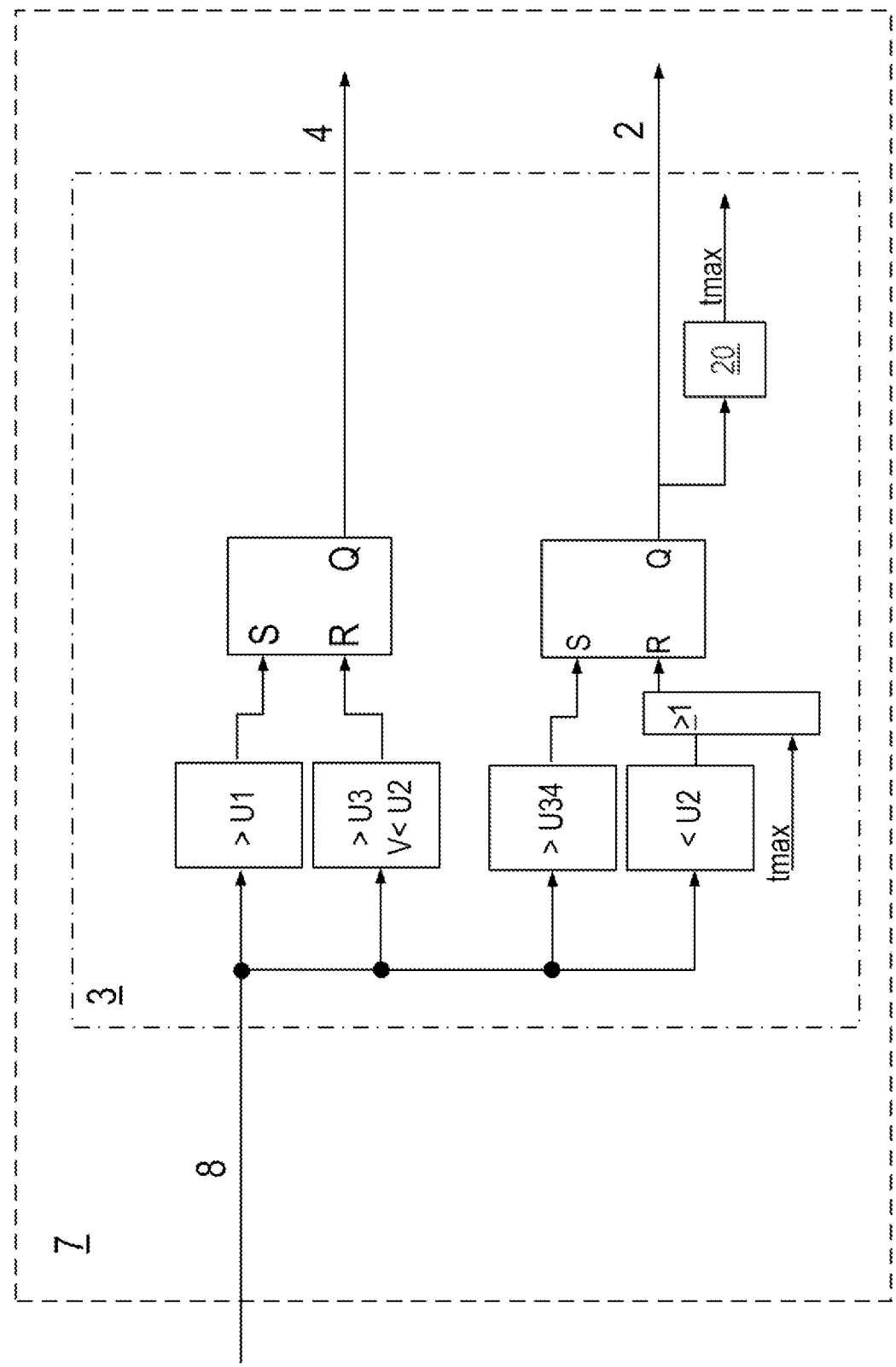
FIG. 2 schematically illustrates control logic 3 in greater detail.

As schematically illustrated in FIG. 2, control logic 3 arranged in signal electronics 7 is configured such that when a first threshold value U1, e.g., 850 Volt, is exceeded, first semiconductor switch 1 is switched on so that brake resistor 1 becomes effective, if provided. In this manner, a further rise of the intermediate circuit voltage is prevented when the power routed to brake resistor 1 is greater than the power introduced into the intermediate circuit, e.g., power of the electric motor produced in a generator mode.

If the intermediate circuit voltage drops below the second threshold value U2, which is smaller than first threshold value U1, first semiconductor switch 11 is switched off again.

However, if the intermediate circuit voltage continues to rise due to a high supply of power produced in a generator mode and introduced into the intermediate circuit, brake resistor 1 and inverter 14 are switched off once a third threshold value U3, e.g., 1000 Volt, for instance, is exceeded, that is to say, first semiconductor switch 11 is opened and also the semiconductor switches of the inverter.

Since a voltage rise is induced during this deactivation, e.g., of brake resistor 1, the intermediate circuit voltage initially rises during the deactivation until a fourth threshold value U4, e.g., 1050 Volt, for example, is exceeded, so that second semiconductor switch 12 is then closed and impedance 9 removes electric power from the intermediate circuit in this manner.

The voltage rise is driven by the stray field inductivity of the motor because when the semiconductor switch of inverter 14 is switched off, the main field inductivity of the motor is cut off. The current driven by the stray field inductivity during the deactivation flows via free-wheeling diodes which are connected in parallel with the semiconductor switches of the inverter.

Impedance 9 then has to absorb only a small energy quantity because the semiconductor switches of inverter 14 and first semiconductor switch 11 are open and rectifier 13 supplies no power into the intermediate circuit since the threshold values are all higher than the peak voltages that occur in the AC-voltage supply network.

As schematically illustrated in FIG. 2, a timer 20 is started after second semiconductor switch 12 has been closed, which induces an opening of second semiconductor switch 12 once a maximum time span tmax has been reached. It is therefore protected against overloading. Maximum time span tmax is, for example, dimensioned such that the predictable excess energy that occurs in the intermediate circuit when first semiconductor switch 11 and the semiconductor switches of inverter 14 are opened is able to be dissipated.

When a drop occurs below second threshold value U2, e.g., 750 Volt, second semiconductor switch 11 is opened again. Thus, the first and the second semiconductor switch (11, 12) are then opened at the same time, for example.

In further exemplary embodiments, no brake resistor 1 is provided. For instance, it may have been forgotten during the production or the initial operation or it was overloaded and destroyed.

LIST OF REFERENCE CHARACTERS 1 brake resistor, e.g., external brake resistor
2 second actuation signal
3 control logic
4 first actuation signal
5 capacitance, e.g., capacitor
6 converter
7 signal electronics
8 acquired intermediate circuit voltage value, e.g., voltage signal
9 impedance
10 limiter unit
11 first controllable semiconductor switch
12 second controllable semiconductor switch
13 rectifier
14 inverter
20 timer
M electric motor
tmax maximum time span

The invention claimed is:

1. A drive system, comprising:
an electric motor;
an inverter having an AC-voltage-side terminal adapted to feed the electric motor;
a first series circuit, including a brake resistor and a first controllable semiconductor switch, connected at a DC-voltage-side terminal of the inverter;
a second series circuit, including an impedance and a controllable second semiconductor switch, connected and/or switched in parallel with the first series circuit; and
a signal electronics connected to a voltage acquisition device adapted to acquire a voltage applied at the DC-voltage-side terminal of the inverter, the signal electronics being configured to generate an actuation signal for the first semiconductor switch and an actuation signal for the second semiconductor switch to close the first semiconductor switch when the voltage exceeds a first threshold value, to open the first semiconductor switch when the voltage exceeds a third threshold value, and to close the second semiconductor switch when the voltage exceeds a fourth threshold value.

2. The drive system according to claim 1, wherein the second series circuit is connected and/or switched in parallel with the DC-voltage-side terminal of the inverter.

3. The drive system according to claim 1, wherein the impedance includes an inductivity and/or an Ohmic resistor.

4. The drive system according to claim 1, wherein the signal electronics is configured to generate the actuation signal for the first semiconductor switch and the activation signal for the second semiconductor switch to close the second semiconductor switch when the voltage exceeds the fourth threshold and to open the second semiconductor switch when the second semiconductor switch was closed for a maximum time span.

5. The drive system according to claim 1, wherein the inverter includes semiconductor switches.

6. The drive system according to claim 5, wherein the semiconductor switches of the inverter are arranged in half bridges connected in parallel, each half bridge including an upper semiconductor switch and a lower semiconductor switch connected in series.

7. The drive system according to claim 5, wherein the semiconductor switches of the inverter are configured to be opened when the voltage exceeds a third threshold value.

8. The drive system according to claim 6, wherein the parallel connection of the half bridges forms the DC-voltage-side terminal of the inverter.

9. The drive system according to claim 6, wherein the parallel connection of the half bridges is connected to the DC-voltage-side terminal of the inverter.

10. The drive system according to claim 6, wherein the parallel connection of the half bridges is directly connected to the DC-voltage-side terminal of the inverter.

11. The drive system according to claim 1, wherein the first threshold value is lower than the third threshold value, and the third threshold value is lower than the fourth threshold value.

12. The drive system according to claim 1, wherein the first semiconductor switch is adapted to be opened when the voltage drops below a second threshold value, the second threshold value being lower than the first threshold value.

13. A method for operating a drive system, comprising:
connecting a first series circuit, which includes a brake resistor and a first controllable semiconductor switch, at a DC-voltage-side terminal of an inverter of the drive system;
connecting a second series circuit, which includes an impedance and a controllable second semiconductor switch, in parallel with the first series circuit;
acquiring a voltage applied at the DC-voltage-side terminal of the inverter; and
generating an actuation signal for the first semiconductor switch and an actuation signal for the second semiconductor switch to close the first semiconductor switch when the voltage exceeds a first threshold value, to open the first semiconductor switch when the voltage exceeds a third threshold value, and to close the second semiconductor switch when the voltage exceeds a fourth threshold value.

14. The method according to claim 13, wherein the second series circuit is connected in parallel with the DC-voltage-side terminal of the inverter.

15. The method according to claim 13, wherein the actuation signal for the first semiconductor switch and the actuation signal for the second semiconductor switch are generated to open the second semiconductor switch when the second semiconductor switch was closed for a maximum time span.

16. The method according to claim 13, further comprising opening semiconductor switches of the inverter when the voltage exceeds a further threshold value.

17. The method according to claim 13, further comprising opening semiconductor switches of the inverter when the voltage exceeds the third threshold value.

18. The method according to claim 13, wherein the first threshold value is lower than the third threshold value, and the third threshold value is lower than the fourth threshold value.

19. The method according to claim 13, wherein the first semiconductor switch is opened when the voltage drops below a second threshold value, the second threshold value being lower than the first threshold value.

20. The method according to claim 13, wherein the drive system includes:
an electric motor;

the inverter having an AC-voltage-side terminal adapted to feed the electric motor;

the first series circuit, including the brake resistor and the first controllable semiconductor switch, connected at the DC-voltage-side terminal of the inverter; and the second series circuit, including the impedance and the controllable second semiconductor switch, connected and/or switched in parallel with the first series circuit.

21. A drive system, comprising:

an electric motor;

an inverter having an AC-voltage-side terminal adapted to feed the electric motor;

a first series circuit, including a brake resistor and a first controllable semiconductor switch, connected at a DC-voltage-side terminal of the inverter; and a second series circuit, including an impedance and a controllable second semiconductor switch, connected and/or switched in parallel with the first series circuit;

wherein the drive system is operated by a method that includes:

connecting the first series circuit, which includes the brake resistor and the first controllable semiconductor switch, at the DC-voltage-side terminal of the inverter of the drive system;

connecting the second series circuit, which includes the impedance and the controllable second semiconductor switch, in parallel with the first series circuit;

acquiring a voltage applied at the DC-voltage-side terminal of the inverter; and generating an actuation signal for the first semiconductor switch and an actuation signal for the second semiconductor switch to close the first semiconductor switch when the voltage exceeds a first threshold value, to open the first semiconductor switch when the voltage exceeds a third threshold value, and to close the second semiconductor switch when the voltage exceeds a fourth threshold value.

22. A method for operating a drive system that includes an electric motor, an inverter having an AC-voltage-side terminal adapted to feed the electric motor, a first series circuit, including a brake resistor and a first controllable semiconductor switch, connected at a DC-voltage-side terminal of the inverter, and a second series circuit, including an impedance and a controllable second semiconductor switch, connected and/or switched in parallel with the first series circuit, comprising:

connecting the first series circuit, which includes the brake resistor and the first controllable semiconductor switch, at the DC-voltage-side terminal of the inverter of the drive system;

connecting the second series circuit, which includes the impedance and the controllable second semiconductor switch, in parallel with the first series circuit;

acquiring a voltage applied at the DC-voltage-side terminal of the inverter; and generating an actuation signal for the first semiconductor switch and an actuation signal for the second semiconductor switch to close the first semiconductor switch when the voltage exceeds a first threshold value, to open the first semiconductor switch when the voltage exceeds a third threshold value, and to close the second semiconductor switch when the voltage exceeds a fourth threshold value.

\* \* \* \* \*